United States Patent [19]
Miller

[11] Patent Number: 5,875,812
[45] Date of Patent: Mar. 2, 1999

[54] METHOD OF PROVIDING INCREASED ACCESS TO TEMPERATURE AND HUMIDITY CONTROL SYSTEMS

[76] Inventor: Melford L. Miller, 104 34th Ave. NE., Hickory, N.C. 28601

[21] Appl. No.: 682,942

[22] Filed: Jul. 16, 1996

[51] Int. Cl.⁶ .................................................. F16L 5/00
[52] U.S. Cl. ..................... 137/360; 137/357; 137/334; 137/557
[58] Field of Search ................................. 137/557, 360, 137/334, 357

[56] References Cited

U.S. PATENT DOCUMENTS

| | | | |
|---|---|---|---|
| 1,206,627 | 11/1916 | Walrath . | |
| 2,158,869 | 5/1939 | Sperzel | 137/334 |
| 2,292,121 | 8/1942 | Hasenburger et al. . | |
| 2,991,481 | 7/1961 | Book | 137/334 |
| 3,136,442 | 6/1964 | Massey | 137/360 |
| 3,633,618 | 1/1972 | Blackmore | 137/557 |
| 3,831,624 | 8/1974 | Doumany . | |
| 3,891,899 | 6/1975 | Sparling . | |
| 3,974,857 | 8/1976 | Hehl . | |
| 3,996,959 | 12/1976 | Carath | 137/360 |
| 4,026,320 | 5/1977 | Grahl . | |
| 4,167,196 | 9/1979 | Morris . | |
| 4,193,420 | 3/1980 | Hewson . | |
| 5,253,670 | 10/1993 | Perrott | 137/360 |
| 5,261,444 | 11/1993 | Childers . | |
| 5,435,342 | 7/1995 | Kohn et al. . | |

*Primary Examiner*—A. Michael Chambers
*Attorney, Agent, or Firm*—Bell Seltzer Intellectual Property Law Group of Alston & Bird LLP

[57] ABSTRACT

A plumbing assembly is disclosed that comprises an access panel which allows increased access to a temperature and humidity control system such as a heating or air-conditioning system. The access panel includes at least one valve for controlling the flow of a fluid and communicates with the first end of a first piping assembly. The second end of the first piping assembly communicates with a second piping assembly typically through a valve situated within the second piping assembly. The second piping assembly is part of a temperature and humidity control system and is generally in fluid communication with a heat transfer coil in the temperature and humidity control system. The access panel allows a technician or inspector to service or inspect a heating or air-conditioning system without the risk of injury and the cost associated with conventional methods.

22 Claims, 2 Drawing Sheets

5,875,812

METHOD OF PROVIDING INCREASED ACCESS TO TEMPERATURE AND HUMIDITY CONTROL SYSTEMS

FIELD OF THE INVENTION

The present invention relates to a method of providing increased access to temperature and humidity control systems such as heating and air-conditioning systems, and particularly relates to increased access of temperature and humidity control systems for large buildings and other similar structures.

BACKGROUND OF THE INVENTION

Large buildings such as schools, office buildings and hotels generally have central heating and air-conditioning systems for controlling the temperature and humidity of the air in the building. These temperature and humidity control systems typically include a fluid source and piping for transporting a fluid such as air, steam or water throughout the building. The control systems generally also contain heat transfer coils which communicate with the piping and are used to moderate the temperature and humidity of a second fluid such as air in the control system to provide warm or cool air to an enclosed space within the building. The piping and heat transfer coils of the temperature and humidity control systems are generally located in between floors in large buildings, thus not affecting the actual workspace and the inside appearance of the building.

Temperature and humidity control systems such as heating and air-conditioning systems typically require periodic service and inspection to keep the system working correctly and efficiently. Such service or inspection may include bleeding air that has accumulated in the heating or air-conditioning system or measuring the temperature or pressure of a fluid in the heating or air-conditioning system to determine if the system is working correctly and efficiently. This is conventionally accomplished by accessing an air vent (usually a valve) in the heating and air-conditioning system. Nevertheless, because the heating or air-conditioning system is generally located between floors in the building, a technician or inspector generally must climb into the ceiling to access the air vent. Often, this requires moving tiles and locating the air vent in the system to access the system. Requiring the technician or inspector to climb into the ceiling can be extremely dangerous and results in an increased risk of injury due to the possibility of falling from ladders or the ceiling. This is especially true in large buildings having high ceilings such as a school gymnasium or a hotel atrium. This increased risk not only may result in injury to technicians or inspectors but may also result in payments by the building owner for liability or worker's compensation to compensate the technician or inspector for his injuries.

In addition, because many technicians and inspectors are frequently paid on an hourly basis, the time needed to access the system increases the cost of service or inspection of the heating or air-conditioning system. Often with large buildings, if there is a problem in the system, numerous locations in the heating or air-conditioning system, even hundreds of locations, must be accessed to determine the location of the problem thus multiplying the risk of injury and cost of service and inspection.

Therefore, there is a need to provide increased access to heating or air-conditioning systems to allow a technician or inspector to access a system and to reduce the risk of injury and the cost associated with conventional methods.

OBJECT AND SUMMARY OF THE INVENTION

It is an object of the present invention to provide increased access to temperature and humidity control systems such as a heating or air-conditioning systems for large buildings and other structures to reduce the risk of injury and the cost associated with service and inspection of the system.

It is a further object of the present invention to provide a safer method of removing air from a temperature and humidity control system.

It is a further object of the present invention to provide a safer method of measuring a property of a fluid such as temperature or pressure in a temperature and humidity control system.

It is a further object of the present invention to provide a method of safely accessing numerous locations in a temperature and humidity control system from a central location.

The present invention meets these objects by providing a plumbing assembly comprising an access panel which contains at least one valve in fluid communication with a temperature and humidity control system. The valve in the access panel communicates with the first end of a first piping assembly. In turn, the second end of the first piping assembly communicates with a second piping assembly typically through a valve situated within the second piping assembly. The second piping assembly is part of the temperature and humidity control system and is generally in fluid communication with a heat transfer coil which may be used to affect the temperature and humidity of a second fluid such as air in the temperature and humidity control system to provide warm or cool air to the building. The access panel is situated in a readily accessible location such as within a wall and permits a technician or inspector to access the temperature and humidity control system without the risk of injury and the cost associated with conventional methods.

In addition, the access panel allows a technician or inspector to safely remove air from the temperature and humidity control system and to measure the temperature and pressure of the fluid in the system. A third piping assembly may be provided from the valve in the access panel to further facilitate air removal and property measurements. The present invention also includes a method of providing increased access to the temperature and humidity control system.

These and other objects of the present invention will become more readily apparent upon consideration of the following detailed description and included drawings which describe both the preferred and alternative embodiments of the invention.

DETAILED DESCRIPTION OF THE INVENTION

Figures 1, 2:
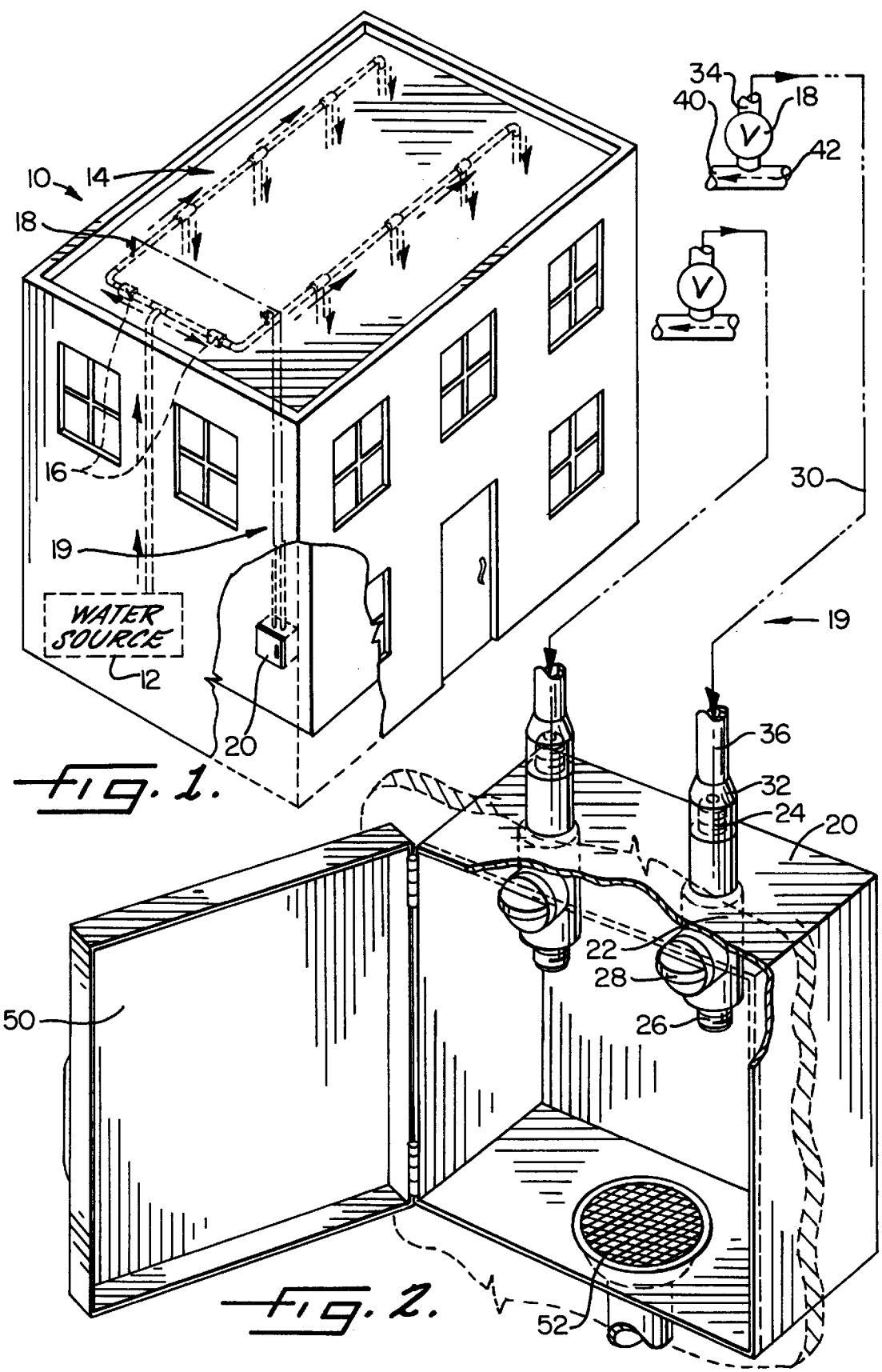
FIG. 1 is a perspective view of a building having a temperature and humidity control system and an access panel in accordance with the present invention.
FIG. 2 is a perspective view of an access panel according to the invention providing access to two locations in the temperature and humidity control system.

As shown in FIG. 1, a building 10 generally includes a temperature and humidity control system such as a heating or air-conditioning system. The temperature and humidity control system typically includes a fluid source 12 and a piping assembly 14 which distributes the fluid throughout the building. The term "piping" as used here refers to one or more pipes, fittings and valves provided in combination to transfer a fluid. Although the fluid source 12 in FIG. 1 is a water source, one skilled in the art would appreciate that steam, air, or an air-conditioning coolant may also be used in the present invention. Alternatively, the fluid may be recycled in the system and the fluid source 12 although capable of providing fluid may participate in recycling the fluid for use in the system. Heat transfer coils 16 are situated in the piping assembly 14 and enable the fluid travelling in the heating or air-conditioning system to affect the temperature and/or humidity of a second fluid as it travels through the system to provide warm or cool air to the building 10. This heat transfer also generally affects the temperature and/or humidity of the fluid flowing through the piping assembly 14. The piping assembly 14 generally includes air vents such as valves 18 which provide access to the heating or air-conditioning system to remove air or measure the temperature or pressure of the fluid in the system. Typically, the valves 18 are provided in close proximity and generally downstream from the coils 16 to provide an adequate measure of the heat transfer efficiency of the coils.

In order to provide increased access to the heating or air-conditioning system as for service and inspection, a plumbing assembly 19 is provided which comprises an access panel 20. As shown in FIG. 1, the access panel 20 may be situated within the wall of a building 10, provided as a free standing structure, or in any other location which provides increased access to the heating or air-conditioning system and is easily accessible by an adult person. As shown in FIG. 2, the access panel 20 comprises at least one valve 22 for controlling the flow of a fluid and having an inlet 24 and an outlet 26. Preferably, the valve 22 is a one way valve to prevent the flow of air through the valve and into the heating or air-conditioning system. The valve 22 can either be provided entirely within the access panel 20 or a portion of the valve may be provided outside of the access panel. In any event, the outlet 26 of the valve 22 is preferably provided within the access panel 20. The flow of a fluid through the valve 22 is controlled by valve control means 28 such as a knob which can be manipulated by a technician or inspector in accordance with the invention. Preferably, the valve control means 28 is located within the access panel 20 to allow easy control of the flow of the fluid through the valve 22. Although FIG. 2 illustrates two valves 22 in the access panel 20, the access panel may include any number of valves generally corresponding to the areas in the heating or air-conditioning system in fluid communication with the plumbing assembly 19. Advantageously, the access to the system is increased by providing as many valves 22 as possible in a single access panel 20 and corresponding to locations in the system.

The plumbing assembly 19 of the invention further comprises a first piping assembly 30 having a first end 32 and a second end 34. The first end 32 of the first piping assembly 30 is in fluid communication with the inlet 24 of the valve 22. As would be easily understood by one skilled in the art, when the valve 22 is located entirely within the access panel 20, a portion of the first piping assembly 30 may be located within the access panel. On the other hand, when only a portion of the valve 22 is located within the access panel 20, the first piping assembly 30 may be entirely located outside the access panel.

The second end 34 of the first piping assembly 30 is in fluid communication with a second piping assembly 40 which is part of the piping assembly 14 of the heating or air-conditioning system. Typically, the second end 34 of the first piping assembly 30 is connected to an air vent such as a valve 18 in the second piping assembly 40 but may be connected to other areas in the piping assembly. As explained above, the valve 18 is normally located proximate to and downstream from a heat transfer coil 16 which is in fluid communication with the second piping assembly 40 to allow measurement of the efficiency of the coil. Advantageously, the first piping assembly 30 connects the valve 22 in the access panel 20 to the heating and air-conditioning system and allows fluid to be transported from the second piping assembly 40 and the heating or air-conditioning system through the first piping assembly and into the valve in the access panel. The first piping assembly 30 typically includes at least one pipe 36 communicating with the valve 22 and may further include other pipes, fittings, and valves as will be appreciated by one skilled in the art. Similarly, the second piping assembly 40 as illustrated in FIG. 2 comprises a pipe 42 and a valve 18 but may further include other pipes, fittings and valves.

Figure 3:
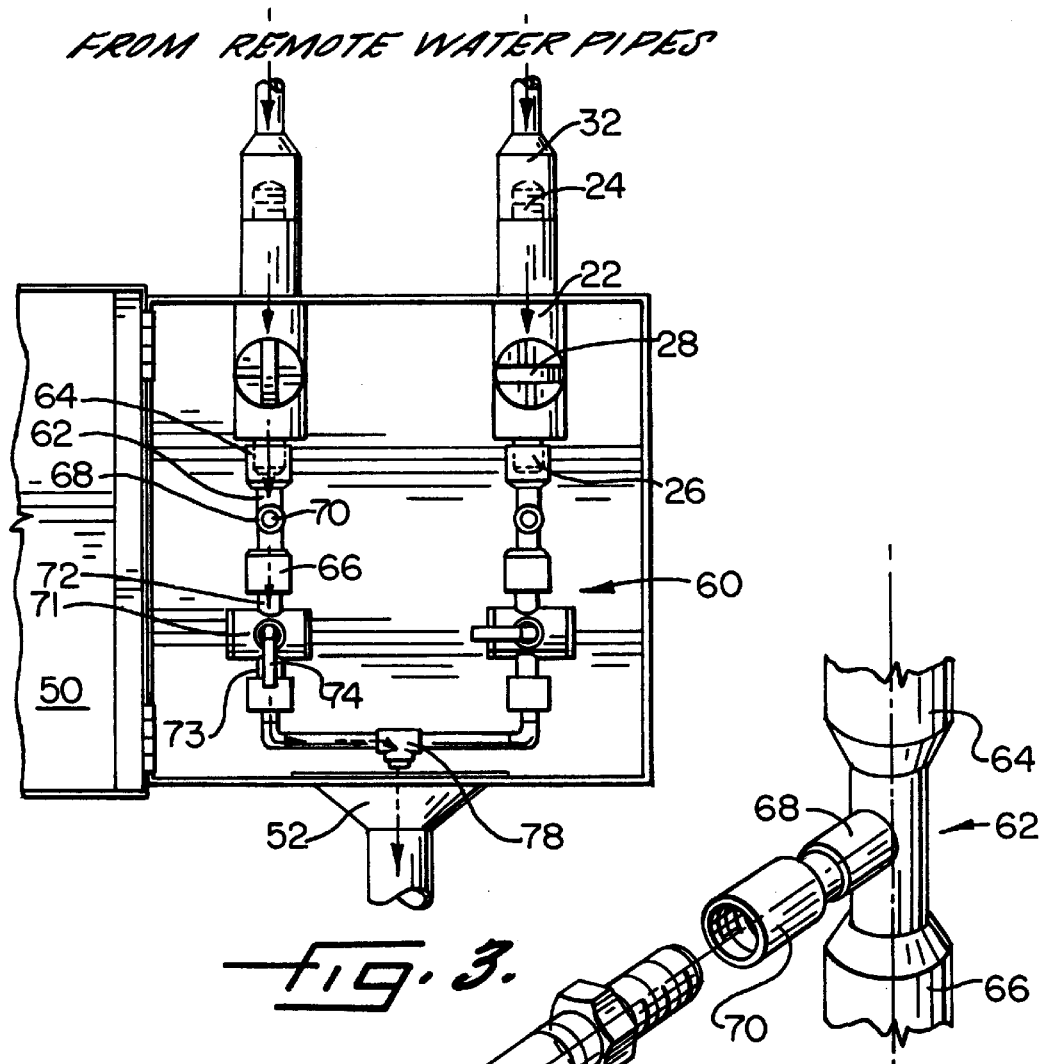
FIG. 3 is a front view of an access panel having a third piping assembly located within the access panel according to an alternative embodiment of the invention.

As shown in FIGS. 2 and 3, the access panel 20 may further include a door 50. The door 50 when closed essentially hides the access panel 20 away from view within a wall and thus does not greatly affect the interior appearance of the building. Furthermore, the access panel 20 may include a drain 52 to remove water or other liquids which are transported through the valve 22. The drain 52 obviates the need for a catch bucket or similar means to dispose of liquids flowing from or accumulating in the access panel 20.

The access panel 20 illustrated in FIG. 2 may include means for measuring the property of a fluid such as its temperature or pressure in the proximity of the valve 22. For example, a temperature or pressure gauge or probe (e.g. thermometer) may be located inside the access panel 20 to determine the temperature or pressure of the fluid. The access panel 20 may further include display means to provide temperature or pressure readings to the technician or inspector.

FIG. 3 illustrates an alternative preferred embodiment of the invention. In FIG. 3, the plumbing assembly 19 further comprises a third piping assembly 60 which is in fluid communication with and generally connects to the outlet 26 of the valve 22. The third piping assembly 60 is preferably provided inside the access panel 20 but a portion of the third piping assembly may be located outside the access panel if desired. The third piping assembly 60 generally comprises a singular pipe or a combination of at least one pipe, fitting or valve. As illustrated in FIG. 3, the third piping assembly 60 may include a T-shaped connector 62 having a first longitudinal fitting 64 connected to the outlet 26 of the valve 22, a second longitudinal fitting 66 opposite the first longitudinal fitting, and a transverse fitting 68. The transverse fitting 68 may be connected to a port 70 for measuring the property of a fluid such as temperature or pressure. As illustrated in FIG. 3, the second longitudinal fitting 66 is connected to a second valve 71 having an inlet 72, an outlet 73, and valve control means 74. A pipe 76 connects to the outlet 73 of the second valve 71 and terminates in a second T-shaped connector 78. Although a preferred embodiment of the third assembly 60 is illustrated in FIG. 3, it would be easily understood by one skilled in the art that other suitable assemblies may also be used with the invention.

Figure 4:
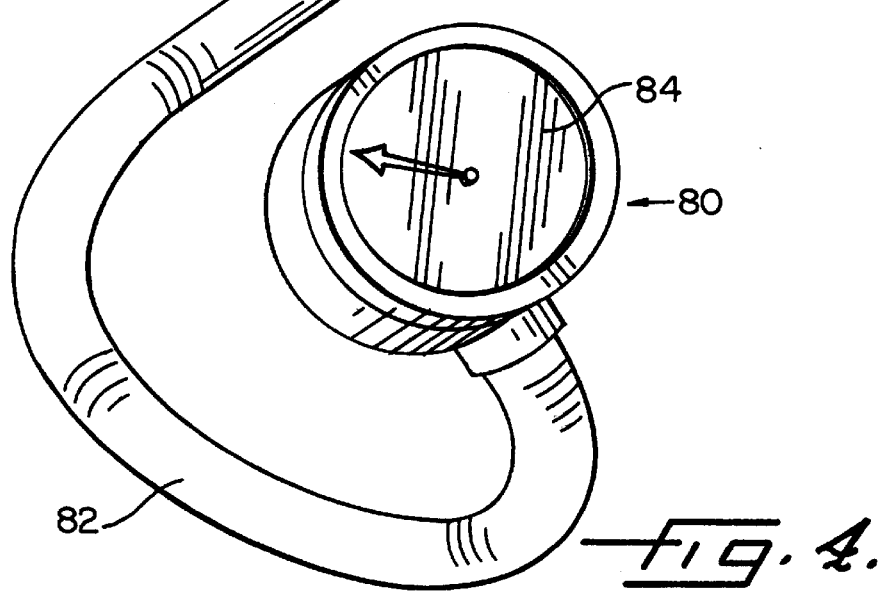
FIG. 4 is a perspective view of a gauge for measuring temperature or pressure for use in the invention.

As illustrated in FIG. 4, when the port 70 is used to measure the temperature or pressure of a fluid, a device 80 providing means of measuring and displaying the temperature or pressure of the fluid may be connected to the third piping assembly 60. The device 80 in FIG. 4 includes a pipe 82 and a gauge 84 for measuring and displaying the temperature or pressure of the fluid. Again, it would be easily understood by one skilled in the art that other suitable assemblies may also be used with the invention.

The present invention also includes a method of venting heating and air-conditioning systems. In use with the present invention, the valve 18 in the second piping assembly 40 is generally open to eliminate the need to access the valve 18 directly. In addition, the valve 22 housed in the access panel 20 is generally closed except when removing air or possibly testing the temperature or pressure of the fluid in the vicinity of the valve. When air is to be removed from the heating an air-conditioning system via the second piping assembly 40, the valve control means 28 is manipulated to open the valve 22 to allow air (or steam) to flow through the valve 22 and out of the outlet 26.

The present invention also provides a method of measuring the property of a fluid in a heating or air-conditioning system such as its temperature or pressure. As described above, the valve 18 is generally open and the valve 22 is generally closed. When measuring the temperature or pressure of the fluid in the vicinity of the valve 22, measuring means may be provided in the vicinity of the valve and may include display means for providing the temperature or pressure of the fluid. The temperature of the fluid in the heating or air-conditioning system may be more accurately measured by opening valve 22 for at least a few seconds and removing the standing fluid in the valve and first piping assembly 30.

Alternatively, as described above, a third piping assembly 60 may be provided and used for measuring and displaying the temperature or pressure of the fluid and for removing air from the heating or air-conditioning system. In the embodiment pictured in FIG. 3, the valve 71 generally is closed except that it may be opened to remove air from the system or to test the temperature or pressure. When air is removed from the system, both the valve 22 and the valve 71 are opened to allow the air to pass through the valve 22 and out of the third piping assembly 60. The temperature of the system may be measured by opening valve 22 and valve 71 and measuring the temperature through the port 70 using a device 80 such as the one illustrated in FIG. 4. As stated above, this method may provide a more accurate method of measuring the temperature of the heating or air-conditioning system. When the pressure of the fluid in the heating or air-conditioning system is being determined, the valve 22 is typically opened and the pressure is measured through the port 70 using a device 80 such as the one illustrated in FIG. 4.

As stated above, the plumbing assembly 19, specifically the access panel 20, of the invention provides increased access to a heating or air-conditioning system thus reducing the risk of injury and the cost associated with service and inspection of the heating or air-conditioning system. The access panel 20 allows a technician or inspector to remove air from the heating or air-conditioning system or to measure the temperature or pressure of the fluid in the system. Additionally, the access panel 20 may contain numerous valves corresponding to locations in the heating or air-conditioning system to further increase access to the system and simplify the service or inspection of the system.

Although the above description generally applies to temperature and humidity control systems such as heating and air-conditioning systems, it will be understood that the invention is not limited thereto and may be applied to other applications since modifications may be made by those skilled in the art, particularly in light of the foregoing description. Therefore, these modifications and embodiments are intended to be included within the spirit and scope of the following appended claims.

That which is claimed:

1. A plumbing assembly which provides increased access to temperature and humidity control systems such as heating and air-conditioning systems in large buildings, said plumbing assembly comprising:

an access panel;

at least one valve in said access panel for controlling the flow of a fluid from a temperature and humidity control system, said valve having an inlet and an outlet, said outlet providing access to said fluid;

a first piping assembly having a first end and a second end, said first end communicating with said inlet of said at least one valve for transporting a fluid to said at least one valve; and a second piping assembly that is part of said temperature and humidity control system and located outside of said access panel, said second piping assembly having a valve communicating with said second end of said first piping assembly for controlling the flow of a fluid from said second piping assembly into said first piping assembly; and a heat transfer coil outside of said access panel and communicating with said second piping assembly.

2. The plumbing assembly according to claim 1 wherein a portion of said at least one valve is located inside said access panel and a portion is located outside said access panel and said first piping assembly is located outside said access panel.

3. The plumbing assembly according to claim 1 wherein said at least one valve is located inside said access panel and a portion of said first piping assembly is located inside said access panel and a portion is located outside said access panel.

4. The plumbing assembly according to claim 1 wherein said at least one valve is a one-way valve.

5. The plumbing assembly according to claim 1 wherein a valve control means for said at least one valve is located inside said access panel.

6. The plumbing assembly according to claim 1 wherein said first piping assembly comprises a pipe.

7. The plumbing assembly according to claim 1 wherein said first piping assembly comprises a pipe in combination with at least one of a pipe, a fitting, and a valve.

8. The plumbing assembly according to claim 1 wherein said second piping assembly further comprises a pipe.

9. The plumbing assembly according to claim 8 wherein said second piping assembly further comprises at least one of a pipe, a fitting, and a valve.

10. The plumbing assembly according to claim 1 further comprising means for measuring the property of a fluid.

11. The plumbing assembly according to claim 10 wherein said means for measuring a property of a fluid is located inside said access panel.

12. The plumbing assembly according to claim 10 further comprising means located inside said access panel for displaying the property of a fluid.

13. The plumbing assembly according to claim 10 wherein said property is selected from the group consisting of temperature and pressure.

14. The plumbing assembly according to claim 1 wherein said plumbing assembly further comprises a third piping assembly connected to said outlet of said at least one valve in said access panel and providing access to said fluid.

15. The plumbing assembly according to claim 14 wherein said third piping assembly comprises a pipe for directing a fluid from said at least one valve in said access panel.

16. The plumbing assembly according to claim 14 wherein said third piping assembly comprises a pipe in combination with at least one of a pipe, a fitting, and a valve.

17. The plumbing assembly according to claim 14 wherein said third piping assembly comprises:
- a T-shaped connector having a first longitudinal fitting connected to said outlet of said at least one valve, a second longitudinal fitting opposite said first longitudinal fitting, and a transverse fitting;
- a port communicating with said transverse fitting for measuring the property of a fluid;
- a second valve having an inlet and an outlet, said inlet of said second valve in fluid communication with said second longitudinal fitting; and
- a pipe in fluid communication with said outlet of said second valve.

18. The plumbing assembly according to claim 14 further comprising means communicating with said third piping assembly for measuring the property of a fluid.

19. The plumbing assembly according to claim 14 wherein said third piping assembly is located within said access panel.

20. The plumbing assembly according to claim 1 wherein said access panel further comprises a drain for removing water from the access panel.

21. The plumbing assembly according to claim 1 wherein said access panel is situated within the wall of a building and readily accessible to an adult person.

22. The plumbing assembly according to claim 1 comprising a plurality of valves in said access panel, each valve communicating with a first piping assembly, each first piping assembly communicating with a second piping assembly, and each second piping assembly having a different location in said temperature and humidity control system.

* * * * *